United States Patent [19]

Walker et al.

[11] Patent Number: 4,666,200
[45] Date of Patent: May 19, 1987

[54] SAFETY GRAPPLE

[75] Inventors: Kenneth L. Walker, Anderson County; John R. White, Roane County, both of Tenn.

[73] Assignee: Remote Technology, Inc., Oak Ridge, Tenn.

[21] Appl. No.: 737,718

[22] Filed: May 28, 1985

[51] Int. Cl.[4] .............................................. G21C 19/00
[52] U.S. Cl. .................................... 294/110.2; 294/95
[58] Field of Search .................... 294/110.2, 110.1, 95, 294/116, 82.1, 106, 88, 86.3, 94, 96; 414/779

[56] References Cited

U.S. PATENT DOCUMENTS 3,199,911  8/1965  Alliot et al. ...................... 294/110.2
3,388,942  6/1968  Johnsson et al. ................. 294/110.2

*Primary Examiner*—James B. Marbert
*Attorney, Agent, or Firm*—Pitts and Brittian

[57] ABSTRACT

A safety grapple for releasably joining an object to be moved to a device for moving the same. Provision is made to cycle the grapple (10) through at least two release procedures before actual release can be effected. This is accomplished through the use of lug actuator cam plate 50 which rotates unidirectionally a selected amount for each upward and downward movement of a central shaft (22) of the grapple (10). This cam (50), with cam followers (52) mounted on the lugs (54), is shaped such that the lugs (54) are pivoted out of engagement with the object (100) only after a selected number of shaft reciprocations. In a specific embodiment, the grapple (10) requires two full cycles of shaft movement before lug release is effected on the third cycle. This prevents inadvertent release of the object (100), a feature especially important in the handling of hazardous material. The actuator cam (50) rotation is effected by a first (44) and a further toothed indexing cam (46) directly connected to the actuating cam (50), and a cam follower (48) mounted from the shaft (22) that moves between these toothed cams (44,46) as the shaft is reciprocated. An annunciator, in the form of a signal flag (90), provides a visual indication of the status of the actuating cam (50) and thus the lugs (54).

20 Claims, 5 Drawing Figures

SAFETY GRAPPLE

TECHNICAL FIELD

This invention relates generally to connectors for releasably grasping objects, and more particularly to a mechanically operated grapple for releasably engaging heavy objects for lifting purposes, the grapple adapted to minimize inadvertent disengagement.

BACKGROUND OF THE INVENTION

During the moving of drums, canisters, and like containers of hazardous materials, it is imperative that such containers not be dropped or otherwise physically mishandled with the attendant potential of dispersal of the hazardous material. For example, canisters of radioactive waste must be safely inserted into, or removed from, vertically oriented storage vaults. These vaults are located in a floor of a storage building and covered with a removable hatch. The canisters are elongated sealed cylinders and often weigh several thousand pounds, e.g. 3,000 to 4,000. This moving of the canisters is accomplished through the use of a grapple suspended from an overhead crane such that the grapple can be indexed over a selected vault unit. The grapple releasably engages a knob-like projection, for example, on the top of the canister. Furthermore, the hatch to the vault weighs of the order of 15,000 pounds. This hatch, too, must be manipulated remotely with a grapple.

Grapples employed in the prior art have been of several types. For example, mechanical grapples utilizing a "scissors" principal have been employed. Fingers engage the under surface of the knob, and grasp the canister when tension is produced by the crane cable. The grapple disengages when this tension is removed. It will be recognized that extreme care must be exercised during the lowering of the canister to prevent inadvertent release of the canister as when the canister is misaligned with the vault, for example.

Other types of grapples utilize pneumatic and/or electrical operators to assure positive engagement of the grapple and the canister. Such grapples must have a "fail safe" capability to prevent inadvertent disengagement. Also, pneumatic and electric systems are subject to damage by high levels of radiation that may be present in the environment of a radioactive waste storage facility.

Accordingly, it is a principal object of the present invention to provide a grapple for moving heavy objects, the grapple adapted to release the object under controlled conditions.

It is another object to provide an all mechanical grapple system that is inert to effects of radiation such that the grapple system can be used for the moving of canisters of radioactive waste.

It is a further object to provide an all mechanical grapple system which does not release from an object unless the steps for release are repeated at least a second time to minimize inadvertent release.

It is also an object of the present invention to provide a grapple system having provisions for locking the same in a grasped position whereby release of an object is prevented until the locking feature is disengaged.

An additional object of the present invention is to provide a grapple unit having provisions to disassemble the lug fingers thereof for emergency disengagement.

Still another object of the present invention is to provide a grapple unit adapted for ready disassembly for the replacement of components as well as the decontamination of the unit should such operations be required.

These and other objects of the present invention will become apparent upon a consideration of the drawings referred to herebelow, and the full description of the invention.

SUMMARY OF THE INVENTION

In accordance with the present invention, there is provided a grapple unit having an axially moving central shaft. Each full upward and each full downward movement rotates an actuating cam a selected angular amount. This cam, engaged with cam followers on pivotable lifting lugs, has a contour such that at least two full strokes of the shaft are required before the lifting lugs can be released from an object. A further number of strokes of the shaft can be required, if desired, by a proper choice of the actuating cam and the mechanism for rotation of that cam. An indicator displays the state of the actuating cam to further prevent inadvertent release of an object. The pivot pins for the lugs are removable for emergency release, and all components are readily disassembled for replacement, maintenance, etc.

BRIEF DESCRIPTION OF THE DRAWINGS

FIG. 2 is a drawing illustrating the engagement of the lugs of the grapple of FIG. 1 with a typical knob of a canister or the like.

FIG. 3 is a drawing illustrating the disengagment of the lugs of the grapple of FIG. 1 with the knob of a canister or the like.

BEST MODE OF THE INVENTION

Figure 1:
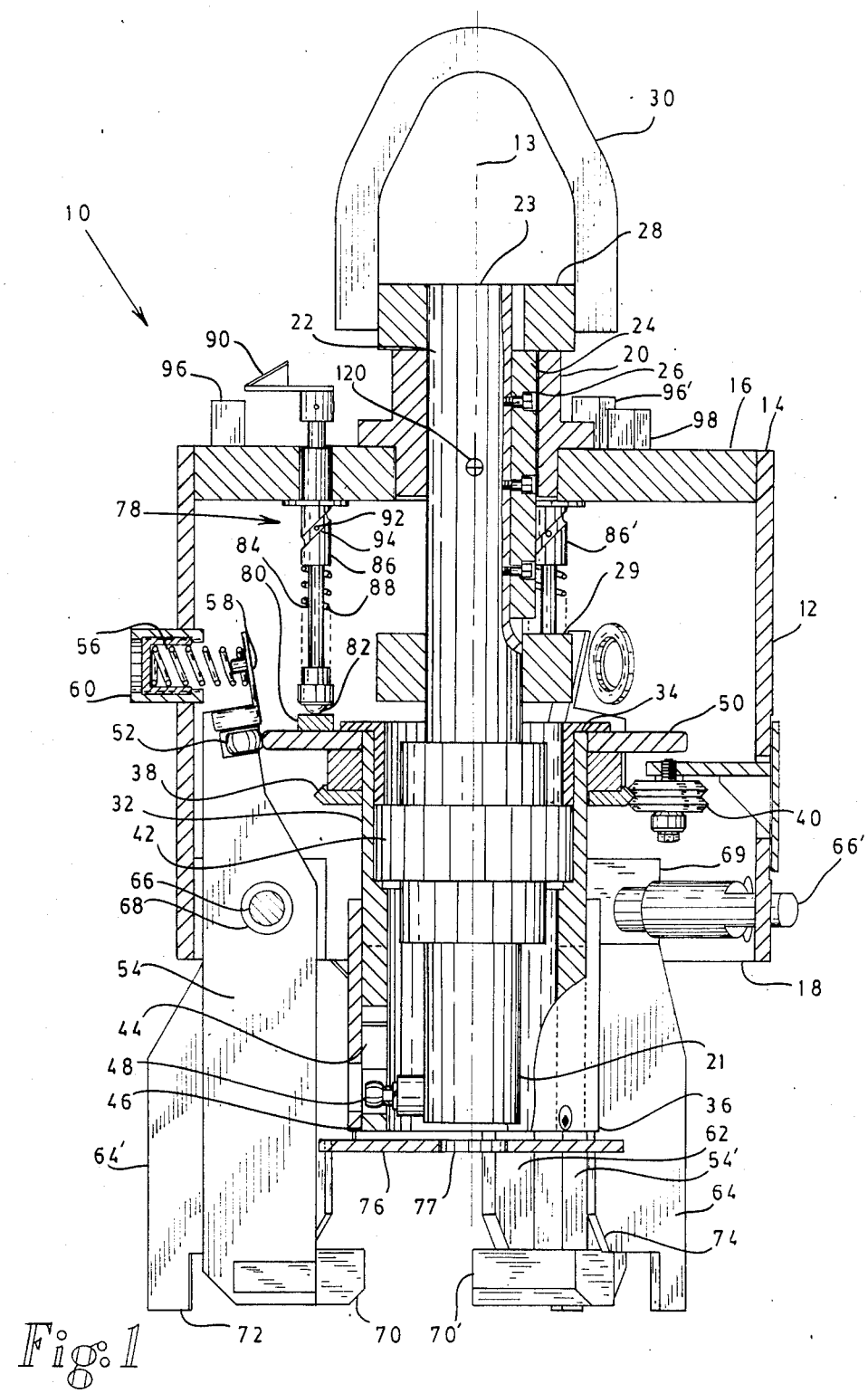
FIG. 1 is a cross-section of a grapple unit as designed to accomplish the above-stated objects.

A grapple unit according to the present invention is indicated at 10 in FIG. 1. This grapple 10 has a cylindrical frame housing 12, having a central axis 13, closed at an upper end 14 with a top plate 16. The housing 12 is open at its lower end 18. The top plate 16 is provided with a centrally located guide housing 20, which housing provides a linear bearing for an axially movable actuating shaft 22. This shaft is provided with a key 24 in keyway 26 to prevent rotation between the shaft 22 and the guide housing 20 (and thus the frame housing 12). The upper end 23 of the shaft 22, exterior the guide housing 20, receives a collar 28 with a bail 30 attached thereto. This bail 30 is provided to attach the grapple 10 to a hoist or other moving device (not shown). Alternately, the collar 28 can be directly connected to a moving device.

Positioned centrally within the housing 12 is a cylincrical sleeve 32 having an upper end 34 and a lower end 36. This sleeve 32 is adapted for rotation relative to the housing 12, without axial movement relative thereto, through the use of a centering guide rail 38 engaged with a plurality of guide rollers 40 (only one shown). Furthermore, the sleeve 32 centrally supports a "Thompson" bearing 42 through which the shaft 22 extends thus permitting axial and rotary movement of the sleeve 32 relative to the shaft 22 and housing 12.

Mounted within the lower end 36 of the sleeve 32 is an upper indexing cam 44 and a lower indexing cam 46. Positioned therebetween is a cam follower 48 which projects radially from the lower end 21 of the shaft 22. As will be discussed in detail in connection with FIGS. 4 and 5, these cams 44, 46 and follower 48 cause unidirectional rotation of the sleeve 32 when the shaft is moved axially in either direction.

The construction of the grapple is such that the indexing cams 44, 46 and their follower 48 do not carry any of the weight due to the grapple itself or of the load carried by the grapple. This is accomplished by the aforementioned collar 28 and by a load block 29 that encircles and is attached to the shaft 22 within the housing 12. For example, at the most downward travel of the shaft 22, the collar 28 rests against the top rim of the guide housing 20. In this position, the follower 48 is engaged in indexing cam 46 but does not put any downward load against that cam. Similarly, when the shaft reaches its upward most travel, the load block 29 is against the underside of the top plate 16. The follower 48 is then registered in the upper indexing cam 44 but does not put any upward load against that cam. For the same reasons, there is no axial force applied to the centering guide rail 38 and rollers 40.

An actuating cam plate 50 having a plurality of substantially flat lobes and valleys is attached to the top of the sleeve 32 and thus rotates about the axis of the shaft 22 when the sleeve 32 is caused to rotate. Engaged with the periphery of the actuating cam plate 50 is a cam follower 52 rotatably mounted in one end of each of a plurality of grapple lugs, e.g., 54, 54'. This cam follower is maintained in contact with the cam 50 by any suitable resilient means, such as by a spring 56 mounted between the housing 12 and a plate 58 extending from the lug 54. A holder 60 provides for replacement of the spring 56, if needed.

Each lug 54 is pivotally mounted between a pair of legs 62, 64 (see lug 54'), with a pivot pin 66 and bushing 68. These legs are each rigidly joined to beams 69 projecting inwardly from the frame housing 12. The pin, more clearly shown at 66', projects outward through the frame housing 12 and is adapted for axial movement whereby it can be disengaged from the lug 54' and the legs 62, 64. Each of the lugs 54 have a finger 70 at a lower end for grasp under a lip of an object to be moved by the grapple 10. Each of the legs is provided with a foot 72 whereby the grapple 10 can be rested upon a flat surface. Furthermore, each leg has a sloped surface 74 to guide the grapple into an engaging position relative to the load. Centrally mounted between the legs, and attached thereto proximate the bottom 36 of the sleeve 32 is an impact plate 76 to contact an object to be grasped by the grapple 10. In this embodiment, the plate 76 is provided with a central aperture 77 in the event an object to be grasped has a central projection (as to be experienced with some waste canisters).

Also shown in FIG. 1 is an indicator system 78 for visually displaying the radial position of the actuating cam plate 50 and thus the "condition" of the lugs 54. Attached to the top of the actuating cam plate 50 is an arcuate stepped cam 80 having the number of steps corresponding to the number of lobes of cam plate and have a center on the central axis 13. In actuality, three such stepped cams 80 (for three lobes) are equally deployed around the cam plate 50. Riding on the cam 80 is a follower 82 at the end of an axially movable rod 84. This rod 84 is mounted within a guide 86 in the top plate 16. The rod is surrounded with a resilient member 88, such as a spring, to assure contact between the follower 82 and the stepped cam 80. The extension of the rod 84 exterior to the top plate 16 carries an indicator flag 90. Rod 84 is caused to rotate due to a pin 92 therethrough riding on a sloped surface 94. Rotation of rod 84 causes the flag 90 to be aligned with one of several upstanding projections 96, 98 of differing height on top of plate 16, these projections carrying indicia corresponding to the various positions of the actuating cam plate 50. The different heights of these projections are also used to indicate position of the lugs. In this embodiment requiring three reciprocating cycles of the shaft 22, the cams 80 provide three steps and there are three projections (only two 96, 98 shown) associated with each flag 90. For remote viewing as in hazardous areas, the indicia on the projections 96, 98 and the flags 90 are visible from any direction.

Figure 2:
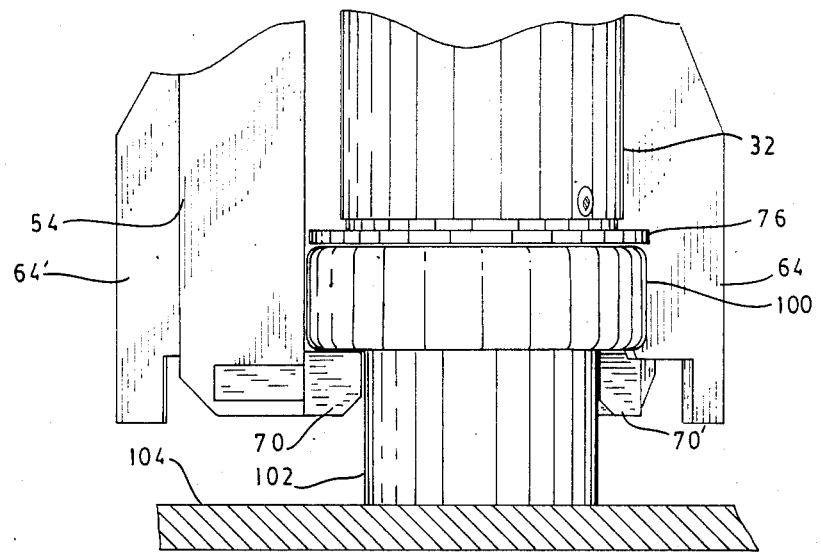

Referring now to FIG. 2, shown therein is the grapple unit 10 in a closed or engaged position. In this position, the fingers 70, 70' are such as to engage the underside of a knob formed by a disk 100 atop a spool 102. This spool and disk are typically an integral portion of an object to be handled by the grapple 10. This object is, for example, the top wall 104 of a canister. It may be seen that in this position, the disk is proximate the plate 76, whose function is to orient the grapple 10 with respect to the top of disk 100.

Figure 3:
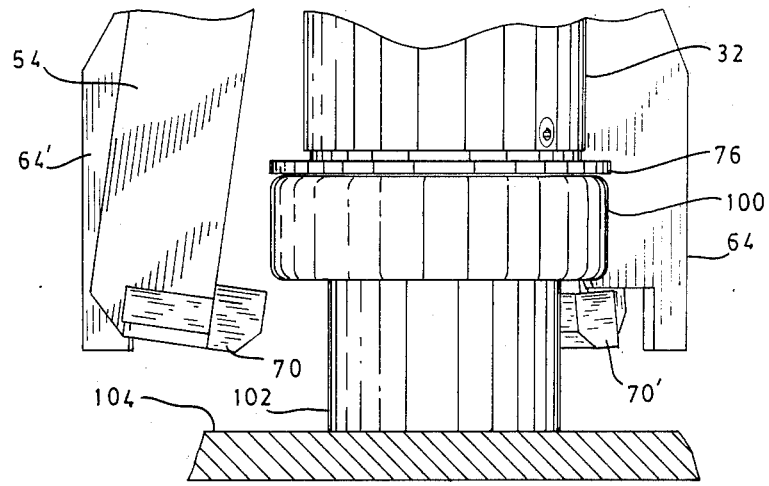

The open or unlatched position of the grapple 10 is illustrated in FIG. 3. When the actuating cam plate 50 is oriented so as to position the cam follower(s) 52 in a valley rather than on a lobe (as discussed in greater detail hereinafter), the lugs 54 pivot such that the fingers 70 are moved out of engagement with the disk 100. The aforementioned spring(s) 56 acting against the plates(s) 58 cause pivotal movement of the lugs about the pivot pin(s) 66. The grapple can then be lifted free from the object previously engaged therewith.

Figure 4:
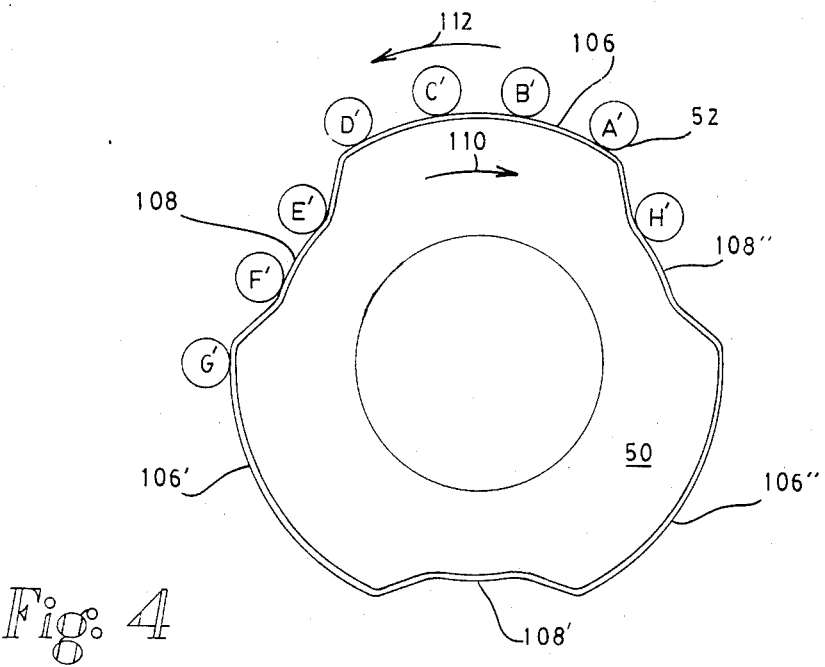
FIG. 4 is a top view of the actuating cam of the grapple of FIG. 1 showing the relative position of a grapple lug cam follower to that cam as the cam is rotated.
Figure 5:
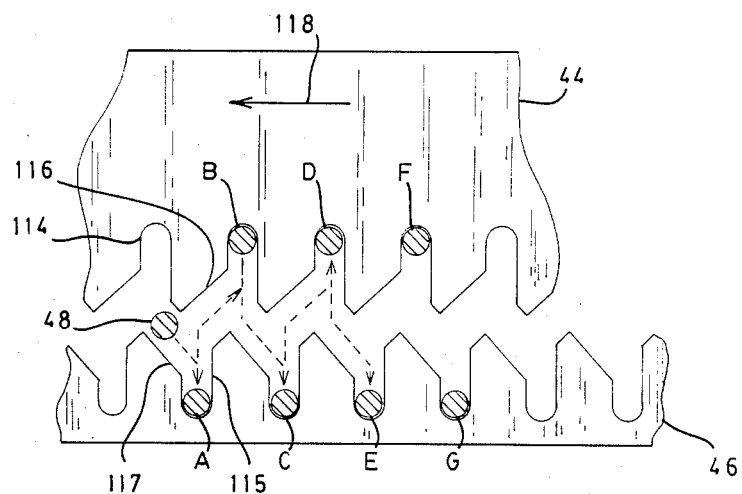
FIG. 5 is a drawing of a portion of a developed view of upper and lower indexing cams, and a cam follower therefor, these cams providing selected rotation of the actuating cam of FIGS. 1 and 4.

The specific mechanism for controlling the operation of the grapple lugs 54 is shown in FIGS. 4 and 5, and the operation can be understood by reference to these figures in combination. FIG. 4 is a top view of the actuating cam 50. In the embodiment shown, cam plate 50 has three substantially flat lobes 106, 106', and 106". These are separated by three substantially flat valleys 108, 108', and 108". The lobes have a dwell time of about 60 degrees, and the valleys of the cam of this embodiment have a dwell time of about 20 degrees. A single cam follower 52 is shown at several positions relative to the cam plate 50. With the cam plate turning in a direction indicated by the arrow 110, the cam follower 52 effectively progresses in a direction indicated by the arrow 112. The various effective positions of the follower 52 are separated by twenty degrees in this embodiment; this angle is set by the apparatus shown in FIG. 5.

FIG. 5 is a partial view of a developed layout of the upper and lower indexing cams 44, 46, respectively identified during a discussion of FIG. 1. These cams can be a part of the sleeve 32, or separate components attached thereto. These cams 44, 46 are mirror images of each other, and include a plurality of deep slots 114, 115 forming teeth, equally spaced about the cam at forty degree intervals and separated from an adjoining tooth in the opposite cam by twenty degree intervals (in this embodiment). Furthermore, the entrance side of each slot is provided with a sloped surface 116, 117 whereby the follower 48 (attached to shaft 22) moves easily from a slot in one cam to the next slot located in the other cam. This movement is produced when the actuating shaft 22 is raised and lowered since the follower 48 is affixed to that shaft. Thus, if the shaft is fully depressed to move the follower 48 to position A, the cams 44, 46 will rotate in a direction indicated by the arrow 118 (the shaft not rotating). When the shaft is lifted, the follower 48 moves to position B, producing further rotation of cams 44, 46 by twenty degrees, etc. Since the cams 44, 46 are attached to the sleeve 32, their rotation effects rotation of the sleeve and also to the actuating cam plate 50. Since FIG. 4 is a top view of cam plate 50, the direction 118 in FIG. 5 is the same as direction 110 of FIG. 4. As stated above, no load is exerted on the cams 44, 46 by the follower 48.

Now comparing FIGS. 4 and 5, the effective movement of follower 52 with respect to the cam plate 50 can be understood. Assuming position A' of follower 52 (FIG. 4) corresponds to position A of the follower 48 (FIG. 5), when the cam 48 moves to position B, follower 52 also moves to position B'. The sequential movement to positions C through G of follower 48 cause the effective movement of follower 52 to positions C' through G'. When follower 52 is in effective positions A' through D' and G', the lugs 54 of the grapple are in the closed or engaged positions (FIG. 2). When the follower 52 is in positions E' and F' or H', the lugs 54 are in their retracted or open positions (FIG. 3).

Assuming that a load object is engaged, and the follower 52 is effectively in position A', it may be seen that the shaft 22 must be moved fully downwardly two times (without release of the load) and on the third full downward stroke, the grapple will disengage. All of these conditions are displayed by the flag 90 as the cam plate 50 (and the attached stepped cam 80) is rotated. Thus, an intermediate movement of the shaft 22 is identified so that an operator will be advised in advance when the grapple will be released. Although the indexing cams 44, 46 are shown at the bottom of sleeve 32, and the actuating cam plate 50 at the top of sleeve 32, the same interaction would be achieved if the positions are reversed or if they are located at other positions along the sleeve.

A typical operation of the grapple 10 in connection with a radioactive waste canister will further serve to illustrate the functioning thereof. Assuming that the grapple is open (lugs retracted, follower 52 in effective position H'), it is lowered over the top of a canister. The slopes 74 on the legs 62, 64 allow for a small misalignment with the disk 100. When the plate 76 contacts the top of the disk 100, the shaft moves downwardly without further downward movement of other components of the grapple until follower 48 moves to position A. This results in follower 52 effectively moving to position A', thereby causing the lugs to close under the disk 100 to engage the same. The canister can then be moved securely to a desired location, e.g., a storage hole or vault. Following this movement, the canister can be lowered (by the crane) until fully seated in that vault. At this position, the shaft 22 of the grapple moves downward, shifting follower 48 to position B as well as follower 52 to position B'; the lugs are still engaged during this movement. Another full upward and downward cycle of the shaft 22 still keeps the lugs engaged; the next downward movement of the shaft 22 moves the follower 52 to effective position E' causing lugs 46 to open and be disengaged from the canister. It should be noted that the flag 90 moves to indicate the number of these cycles.

There is a potential problem of the lugs not releasing from an object, in this case the canister. For this reason, the lug pivots 66 of the grapple (see FIG. 1) can be removed by pulling axially thereon. This removes the lugs from the rest of the grapple unit 10 to solve the release problem. Furthermore, since the legs 62, 64 extend from the housing at least the same distance as the lugs 54, the entire grapple (when free of an object) can be rested on the ends 72 upon the floor or other level surface.

The present grapple is provided with a further safety feature in the form of a transverse aperture 120 in the shaft 22. When the shaft is substantially fully raised, this aperture 120 is above the top of the guide housing 20. A ball-detent pin (not shown) inserted in this aperture 120 prevents movement of the shaft and thus locks all lugs in the position achieved in that particular upward move.

Although the cam construction described above provides for a three-step operation to release an object, the cams (actuating cam plate and indexing cams) can be changed in angular spacings to provide for as few as two complete cycles to release an object, or for greater than the three as disclosed. Furthermore, as few as two lugs can be used for certain applications; or even a greater number of lugs can be used. The actuating cam plate is provided with the same number of lobes as the number of lugs.

Other embodiments of a grapple employing the principal described herein can be constructed for specific purposes. For example, if an object to be grasped is provided with an inwardly directed rim, lugs that move away from each other can be used to grasp that ring. For such operation, the fingers of the lugs are turned outwardly. These lugs are then moved by, for example, the same actuating cam plate 50 as shown but with the lugs pivoted above the positon of the cam follower 52 whereby the lobes of the cam plate would move the fingers of a lug outwardly. Alternatively, the "open" position described above can be considered the "engaging" position for this type of grapple if the fingers are turned outwardly.

The construction of the grapple as shown in FIG. 1 is amenable to partial or complete disassembly, if desired, with a minimum of operations. Although not shown, most of the components are joined with machine screws that can be inserted or removed with remotely-operated tools, if necessary. Thus, components can be readily replaced when necessary. The entire unit is easily cleansed, as for decontamination, with no detrimental effect upon the components.

The above description considers the grapple to be operated in a vertical orientation; however, such orientation is not a requirement of the construction. It may be desired, for example, to safely couple—by use of the grapple—objects to be moved horizontally. Rather than use of a bail 30, the end 23 of shaft 22 would be connected to the moving device. The grapple as described is equally suited to such use. It will also be apparent to one versed in the art that the lugs and fingers can be appropriately configured to releasably grasp objects of other configurations.

Although only specific embodiments of the present invention are shown and described herein, the invention is not to be limited by those embodiments. Rather, the scope of the invention is to be defined by these descriptions taken together with the attached claims and their equivalents.

We claim:

1. A grapple unit for attachment to a moving device for releasably engaging an object to be moved thereby, such grapple adapted to prevent inadvertent release of such object, which comprises:

a frame housing having a central axis;

a shaft, having a first end and a further end, adapted for non-rotatable movement along said central axis, said first end projecting from said frame housing for connection to such moving device, and said further end positioned within said frame housing;

a sleeve mounted within said frame housing concentrically surrounding said shaft, said sleeve adapted for unidirectional rotation relative to said shaft without axial movement relative to said frame housing;

a first and a further cylindrical indexing cam fixedly carried by said sleeve, said cams having toothed surfaces directed toward each other, said toothed surfaces being mirror images, with said teeth being equally spaced around said indexing cams at selected angular positions, and said further indexing cam positioned with teeth thereof interposed in spacing equally between teeth of said first indexing cam;

an indexing cam follower projecting radially from said shaft, said indexing cam follower engaging said toothed surfaces of said indexing cams whereby axial movement of said shaft results in movement of said indexing cam follower into a succession of said teeth of said indexing cams and in said unidirectional rotation of said sleeve, the amount of rotation of said sleeve due to each axial movement of said shaft corresponding to said selected angular spacing of said teeth of said indexing cams;

an actuating cam plate fixedly carried by said sleeve perpendicularly oriented to said central axis and adapted to rotate about said central axis, said cam plate provided on the periphery thereof with a selected plurality of substantially flat lobes and valleys, said lobes and valleys having selected dwell times;

a plurality of lifting lugs for engagement with such object, said plurality of lugs equal in number to said plurality of lobes, each of said lugs having a first end and a further end, said further end adapted to releasably grasp such object;

pivot means for mounting each of said lugs to said frame housing for radial pivotal movement of said lugs relative to said central axis;

a lug cam follower attached to each of said lugs for engagement with said periphery of said actuating cam plate whereby said lugs are pivoted about said pivot means as said lug cam followers move between said lobes and said valleys; and wherein said selected angular positions of said teeth of said indexing cams and said selected dwell times of said lobes and valleys of said cam plate necessitate more than one reciprocation of said shaft to release said further ends of said lugs from such object.

2. The grapple of claim 1 wherein each of said lugs is provided at said further end with a finger directed toward said central axis, said lug cam follower is rotatably attached to said first end of said lugs, said pivot means is intermediate said first and further ends of said lug whereby said lobes cause said fingers to move toward said central axis to grasp such object.

3. The grapple of claim 1 wherein said selected angular position of said teeth of said indexing cams and said dwell times of said lobes and valleys of said cam plate are chosen such that said lugs are released from such object only on a third reciprocation of said shaft.

4. The grapple of claim 3 wherein each tooth of each of said first and further indexing cams is spaced from adjoining teeth by 40 degrees, said further indexing cam is oriented so each tooth thereof is spaced from an adjoining tooth of said first indexing cam by 20 degrees, said dwell time of each of said lobes is substantially 60 degrees, said dwell time of each of said valleys is substantially 20 degrees, and said indexing cam follower is rotatably mounted on said shaft.

5. The grapple of claim 1 wherein said frame housing is a hollow cylinder closed at one end with an end plate provided with a circular aperture concentric with said central axis, and further comprises:

a guide housing carried in said aperture in said end plate, said guide housing attached to said end plate and having a central passageway for receiving said shaft, said passageway provided with an axial keyway;

a key carried by said shaft engaged with said keyway for preventing rotation between said shaft and said guide housing;

a collar attached to and surrounding said shaft at said first end exterior to said frame housing, said collar limiting movement of said shaft into said frame housing;

a load block attached to and surrounding said shaft within said frame housing at a position between said sleeve and said end plate, said load block limiting movement of said shaft out of said frame housing, said collar and said load block preventing application of load between said indexing cam follower and said indexing cams; and a bearing member surrounding said shaft within said sleeve, said bearing member supporting said shaft during both axial and rotational motion between said shaft and said sleeve.

6. The grapple of claim 1 further comprising a visual annunciator system exterior to said frame housing and operated by said actuating cam plate to indicate rotational position of said actuating cam plate.

7. The grapple of claim 6 wherein said visual annunciator system comprises:

a plurality of arcuate stepped cams mounted on a surface of said actuating cam plate toward said end plate, one stepped cam for each lobe of said cam plate, each of said stepped cams uniformly spaced from said central axis;

an axially movable cam follower engaged with each of said stepped cams and extending through said end plate, said axially movable cam follower provided with means to produce rotation thereof in proportion to axial movement;

a plurality of projections attached on an exposed surface of said end plate proximate said extension of each of said axially movable cam followers, each of said projections corresponding to the number of reciprocations of said shaft needed for release of such object; and a signal flag attached to said extension of each of said axially movable cam followers to be directed toward one of said projections corresponding to the position of said axially movable cam follower on said stepped cam and corresponding to the rotation of said actuating cam plate due to reciprocation of said shaft.

8. The grapple of claim 1 further comprising guide legs mounted from said frame housing on each side of each of said lugs, said guide legs having a first end attached to said frame housing and a further end extending proximate said further end of said lugs, each of said guide legs provided with an aperture to receive said pivot means.

9. The grapple of claim 8 wherein said pivot means for each lug is a pivot pin passing through said aperture of said guide legs on each side of said lug and through said lug, said pivot pin adapted for removal to release said lug from said grapple.

10. The grapple of claim 8 wherein said first ends of said guide legs are disposed within and attached to said frame housing, and said further ends of said guide legs are contoured to guide said grapple into engagement with such object.

11. The grapple of claim 5 wherein said actuating cam plate is attached to a first end of said sleeve toward said end plate, said first and further indexing cams are attached to a further end of said sleeve, and said indexing cam follower is attached to said further end of said shaft.

12. The grapple of claim 11 further comprising:
a circular centering guide rail projecting radially from said sleeve intermediate said actuating cam plate and said indexing cams; and
a plurality of guide rollers supported from said frame housing and engaged with said centering guide rail to center said sleeve within said frame housing as said sleeve is rotated.

13. The grapple of claim 10 further comprising an impact plate oriented perpendicularly to said central axis and attached to said guide legs to contact such object as such object is guided into said grapple.

14. The grapple of claim 5 further comprising a crane bail attached to said collar for use when such moving device is an overhead crane system.

15. The grapple of claim 1 further comprising resilient members disposed between said frame housing and each of said lugs for maintaining said lug cam followers in contact with said periphery of said actuating cam plate.

16. The grapple of claim 15 wherein said resilient members are coil springs disposed in cavities in said frame housing, with an exposed end of said springs bearing against said lugs.

17. The grapple of claim 5 wherein said shaft is provided with a transverse aperture between said collar and said load block, said transverse aperture positioned to be located exterior to said frame housing when said load block is positioned against said end plate, and further comprises a locking pin releasably engaged with said transverse aperture to prevent axial movement of said shaft unless said locking pin is removed from said transverse aperture in said shaft.

18. A grapple unit for releasably engaging an object to be moved thereby, such grapple adapted to prevent inadvertent release of such object, which comprises:
a hollow cylindrical frame housing having a central axis, said frame housing closed by an end plate at a first end and open at a second end, said end plate provided with a centrally disposed aperture;
a guide housing carried in said aperture of said end plate, said guide housing attached to said end plate and having a central passageway, said passageway provided with an axial keyway;
a shaft positioned along said central axis adapted for axial movement in said passageway, said shaft provided with a key engaged in said keyway to prevent rotation of said shaft relative to said guide housing, said shaft having a first end disposed exterior to said frame housing and a further end disposed within said frame housing;
a substantially cylindrical sleeve, having a first end disposed toward said end plate and a further end, rotatably mounted within said frame housing, said sleeve provided with a radially extending centering guide rail intermediate said first and further ends;
a plurality of guide rollers rotatably mounted from said frame housing engaged with a periphery of said centering guide rail for maintaining said sleeve concentric with said frame housing;
a bearing member disposed within said sleeve intermediate said first end and said further end of said sleeve, and surrounding said shaft, said bearing member providing for axial and rotational movement between said shaft and said sleeve;
first and further cylindrical indexing cams fixedly attached to said further end of said sleeve, said indexing cams being concentric with said central axis, said cams having toothed surfaces directed toward each other, said toothed surfaces being mirror images, with said teeth being equally spaced around said indexing cams at selected angular positions, and said teeth of said first indexing cam equally spaced between said teeth of said further indexing cam;
a rotatable indexing cam follower disposed between said first and further indexing cams, said indexing cam follower projecting radially from said further end of said shaft, whereby axial movement of said shaft moves said indexing cam follower into a succession of said teeth of said indexing cams and results in unidirectional rotation of said sleeve, the amount of rotation of said sleeve due to each axial movement of said shaft corresponding to said selected angular spacing of said teeth of said indexing cams;
an actuating cam plate fixedly carried by said sleeve at said first end thereof oriented perpendicularly to said central axis and adapted to rotate with said sleeve about said central axis, said cam plate being provided on a periphery thereof with a selected plurality of substantially flat lobes and valleys, said lobes and valleys having selected dwell times;
a plurality of lifting lugs, said plurality of lugs equal in number to said plurality of lobes, each of said lugs having a first end disposed within said frame housing, and a further end for releasable engagement with such object extending from said open end of said frame housing, each of said lugs being provided with a pivot aperture;
guide legs on each side of each of said lifting lugs, said guide legs having a first end fixedly mounted to said frame housing and a further end extending proximate said further end of said lugs, said further end of said legs contoured to guide said grapple into engagement with such objects, each of said legs provided with a pivot aperture;

pivot pins for each of said lugs, said pivot pin of each lug passing through said pivot aperture of said lug and said pivot aperture of each leg on opposite sides of each lug, for releasably mounting said lugs to said frame housing for radial pivotal movement of said lugs relative to said central axis, said pivot pins adapted for removal from said lugs and said legs to release said lugs from said frame housing;

a rotatable lug cam follower attached to said first end of each of said lugs, said lug cam follower engaged with said periphery of said actuating cam plate whereby said lobes and valleys of said cam plate produce said pivotal movement of said lugs;

a coil spring mounted between said frame housing and said first end of each of said lugs for maintianing said lug cam followers in contact with said periphery of said cam plate; and wherein said selected angular positions of said teeth of said indexing cams and said selected dwell times of said lobes and valleys of said cam plate prevent removal of said lugs from such object until said shaft has completed three axial reciprocations.

19. The grapple unit of claim 18 wherein said selected angular positions of said teeth in each of said indexing cams is 40 degrees, said teeth of said first indexing cam are oriented 20 degrees from said teeth of said further indexing cam, said selected dwell time of each of said lobes is substantially 60 degrees and said selected dwell time of each of said valleys is substantially 20 degrees.

20. The grapple unit of claim 19 further comprising:
a collar attached to and surrounding said shaft at said first end exterior to said frame housing, said collar limiting movement of said shaft into said frame housing;

a load block attached to and surrounding said shaft within said frame housing at a position between said first end of said sleeve and said end plate, said load block limiting movement of said shaft out of said frame housing, said collar and said load block preventing application of load between said indexing cam follower and said indexing cams; and wherein said shaft is provided with a transverse aperture at a location exterior to said frame housing when said load block is against said end plate, said aperture adapted to receive a removable pin to prevent operation of said grapple unit until said removable pin is removed.

* * * * *